L. C. LEWIS.
CHURN.
APPLICATION FILED SEPT. 10, 1908.
913,742.
Patented Mar. 2, 1909.
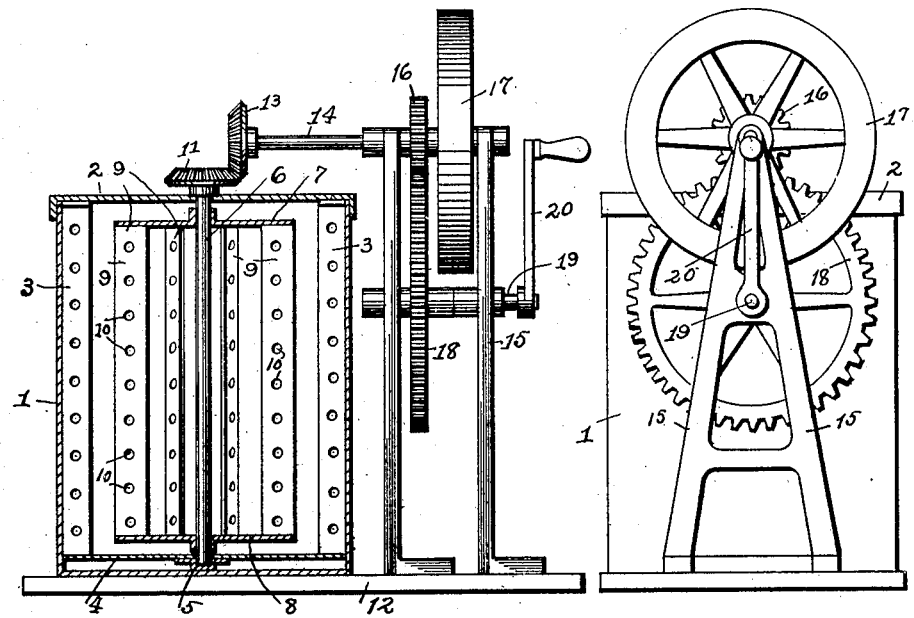
Fig. 1.
Fig. 2.
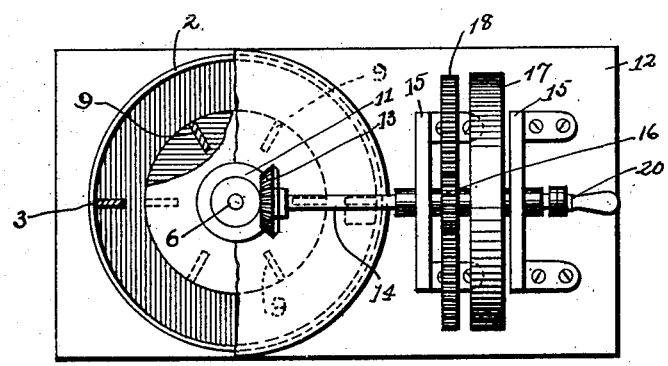
Fig. 3.
Witnesses
Carl Stoughton
A. L. Phelps
Inventor
Lewis C. Lewis
By
C. C. Shepherd
Attorney

UNITED STATES PATENT OFFICE.

LEWIS C. LEWIS, OF COLUMBUS, OHIO, ASSIGNOR TO THE ECLIPSE MANUFACTURING COMPANY, OF COLUMBUS, OHIO, A CORPORATION OF OHIO.

CHURN.

No. 913,742.  Specification of Letters Patent.  Patented March 2, 1909.

Application filed September 10, 1908. Serial No. 452,405.

*To all whom it may concern:*

Be it known that I, LEWIS C. LEWIS, a citizen of the United States, residing at Columbus, in the county of Franklin and State of Ohio, have invented certain new and useful Improvements in Churns, of which the following is a specification My invention relates to churns of that class in which a rotary dasher is employed and which is adapted to be driven by hand or other power.

The objects of my invention are to provide an improved churn of this class of simple construction and arrangement of parts; to provide improved means for producing the desired agitation of the cream and a rapid generation of butter; to so construct my improved device as to facilitate the cleaning of the parts thereof and produce other improvements the details of which will be more fully pointed out hereainfter. These objects I accomplish in the manner illustrated in the accompanying drawing, in which:

Figure 1 is a central vertical section of my improved churn showing the operating mechanism in elevation, Fig. 2 is a side elevation, and, Fig. 3 is a plan view with a portion of the lid or churn cover broken away.

Similar numerals refer to similar parts throughout the several views.

1 represents a suitable upright casing or churn body, which is preferably cylindrical in form. The upper and otherwise open end of the casing is adapted to be closed by a suitable cover 2 having a downwardly flanged marginal portion, as shown. The cover 2 is provided on its underside with opposing vertical blades 3, which are perforated as shown and the upper ends of which are secured to the undersides of said cover, the outer edges of said blades being in contact with the inner surface of the casing 1. These fixed blades 3 extend to the upper surface of a horizontal removable bottom plate or disk 4, which is adapted, as shown, to be contained in the lower end portion of the casing 1 and which is formed on its underside and central portion with a socket projection 5 which bears upon the central portion of the casing bottom.

Journaled in the central portion of the cover, is the upper end portion of a central vertical shaft 6, the lower end of which passes through a central opening in the bottom plate 4 and bears rotatably in the socket projection 5. The shaft 6 carries a rotary dasher which comprises upper and lower disks or plates 7 and 8, which in their outer portions are connected at intervals by radially arranged vertical dasher blades or bars 9, the latter being perforated as indicated at 10. The upper end of the shaft 6 above the cover 2, carries a bevel wheel 11 which when the case 1 is properly seated on its supporting platform 12 gears with a bevel wheel 13 carried on the outer end of a horizontal shaft 14 which shaft is journaled in the upper portions of frame standards 15 which are supported from the platform 12. The shaft 14 carries a pinion wheel 16 and a fly-wheel 17 between the upper portions of the standards 15. The teeth of the pinion wheel mesh with those of a comparatively large gear wheel 18 which is carried on a crank shaft 19 which is journaled horizontally in the frame members 15 below the fly-wheel and which may have rotary motion imparted thereto by means of a crank 20 or by other suitable means.

In operation, the rotary motion imparted to the shaft 19 is contributed to the shaft 14 through the gear wheels 18 and 16 and the rotary motion thus imparted to the bevel wheel 13 operates through the rotation of the bevel wheel 11 to impart a desirable rapid rotary motion to the shaft 6 and its rotary dasher. By the construction described, the currents imparted to the cream contained in the casing 1 created by the movement of the dasher bades, will be broken by contact with the fixed blades 3 and by being forced through the perforations of said fixed blades and those of the dasher blades, thereby creating such agitation of the cream, as to insure an exceedingly rapid generation of butter. It is obvious that when the churning operation is completed, the case 1 may be moved to one side of its former position and the cover 2 together with the dasher and blades 3, readily withdrawn from the case. The parts thus being removed from the case, it is obvious that they may be readily and conveniently cleaned and that the inner surface of the case will be free from obstructions which will greatly facilitate the cleaning of the same after the butter is withdrawn It will be observed that my improved churn is simple of construction and its operation such as to insure the making of butter in a comparatively short time.

What I claim, is:

1. In a churn, the combination with a receptacle of a removable cover therefor, a plurality of straight vertical radially disposed perforated blades connected with said cover and extending substantially the full depth of said casing, a vertical shaft, and a dasher carried by said shaft, said dasher comprising a plurality of straight vertical radially disposed perforated blades which extend substantially the full height of the casing.

2. In a churn, the combination with a receptacle, of a removable cover therefor, a plurality of straight vertical radially disposed perforated blades connected with said cover and extending substantially the full depth of said casing, a vertical shaft, a dasher carried by said shaft, said dasher comprising a plurality of straight vertical radially disposed perforated blades which extend substantially the full height of the casing, and a removable plate upon which the lower ends of the first named blades rest, the lower end of said vertical shaft being journaled in said removable plate.

In testimony whereof I affix my signature in presence of two witnesses.

LEWIS C. LEWIS.

Witnesses:
L. CARL STOUGHTON,
A. L. PHELPS.